United States Patent [19]

Hayashi

[11] Patent Number: 5,760,753
[45] Date of Patent: Jun. 2, 1998

[54] METHOD OF DRIVING PLASMA ADDRESSED DISPLAY PANEL

[75] Inventor: Masatake Hayashi, Kanagawa, Japan

[73] Assignee: Sony Corporation, Tokyo, Japan

[21] Appl. No.: 640,056

[22] Filed: Apr. 30, 1996

[30] Foreign Application Priority Data

May 12, 1995 [JP] Japan .................. 7-138710

[51] Int. Cl.$^6$ .............. G09G 3/28; G09G 3/36; G02F 1/133
[52] U.S. Cl. .............. 345/60; 345/99; 345/100; 349/32
[58] Field of Search .............. 345/60, 98, 97, 345/99, 100, 204; 315/169.4; 349/32; 363/86

[56] References Cited

U.S. PATENT DOCUMENTS

| | | | |
|---|---|---|---|
| 4,296,357 | 10/1981 | Hirayama et al. | 315/169.4 |
| 4,855,892 | 8/1989 | Lower | 363/86 |
| 5,013,137 | 5/1991 | Tsuboyama et al. | 345/97 |
| 5,077,553 | 12/1991 | Buzak . | |
| 5,155,613 | 10/1992 | Sakayori | 345/97 |
| 5,349,454 | 9/1994 | Iwama | 345/60 |
| 5,349,455 | 9/1994 | Hayashi et al. | 349/32 |
| 5,420,707 | 5/1995 | Miyazaki | 349/32 |
| 5,461,395 | 10/1995 | Stein | 345/60 |
| 5,499,122 | 3/1996 | Yano | 349/32 |
| 5,525,862 | 6/1996 | Miyazaki . | |
| 5,563,624 | 10/1996 | Imamura | 345/100 |
| 5,592,191 | 1/1997 | Tsuboyama et al. | 345/97 |
| 5,596,431 | 1/1997 | Bongaerts et al. | 345/60 |
| 5,657,035 | 8/1997 | Miyazaki | 345/60 |

FOREIGN PATENT DOCUMENTS

| | | |
|---|---|---|
| 0 325 387 | 7/1989 | European Pat. Off. . |
| 0 567 020 | 10/1993 | European Pat. Off. . |
| 0 652 458 | 5/1995 | European Pat. Off. . |

*Primary Examiner*—Steven Saras
*Assistant Examiner*—Paul A. Bell
*Attorney, Agent, or Firm*—Hill & Simpson

[57] ABSTRACT

To normally display an image and prevent open circuiting of drive circuits by optimizing power supplying sequences upon turn-on and turn-off of a back light of a plasma addressed display panel, a plasma addressed display panel 1 having a laminated structure of a liquid crystal cell and a plasma cell is provided, wherein the liquid crystal cell includes signal electrodes 4 arranged in columns and the plasma cell includes discharge channels 4 arranged in rows. Upon turn-off of the power switches, the supply of power to the plasma drive circuit 2 is stopped after the supply of power to the liquid crystal drive circuit 2 is stopped. Moreover, the supply of power to the drive circuits 2, 3 is stopped after a back light 8 is turned off. Upon turn-on of the power switches, the supply of power to the plasma drive circuit 2 and the liquid crystal drive circuit 3 is started after the supply of power to a control circuit 7 is started to enable the control circuit 7. Moreover, the back light 8 is turned on after the supply of power to both the drive circuits 2, 3 is started to enable the operation of both the drive circuits 2 and 3.

7 Claims, 4 Drawing Sheets

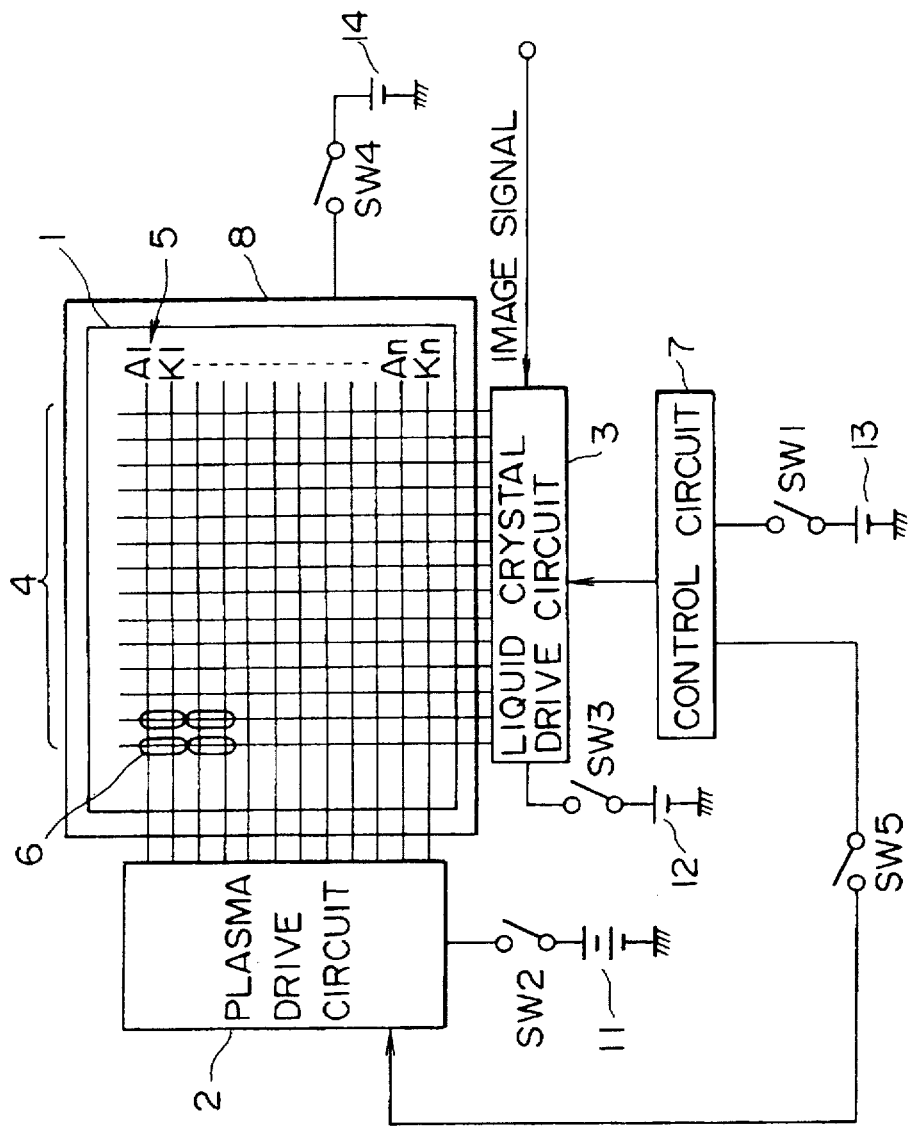

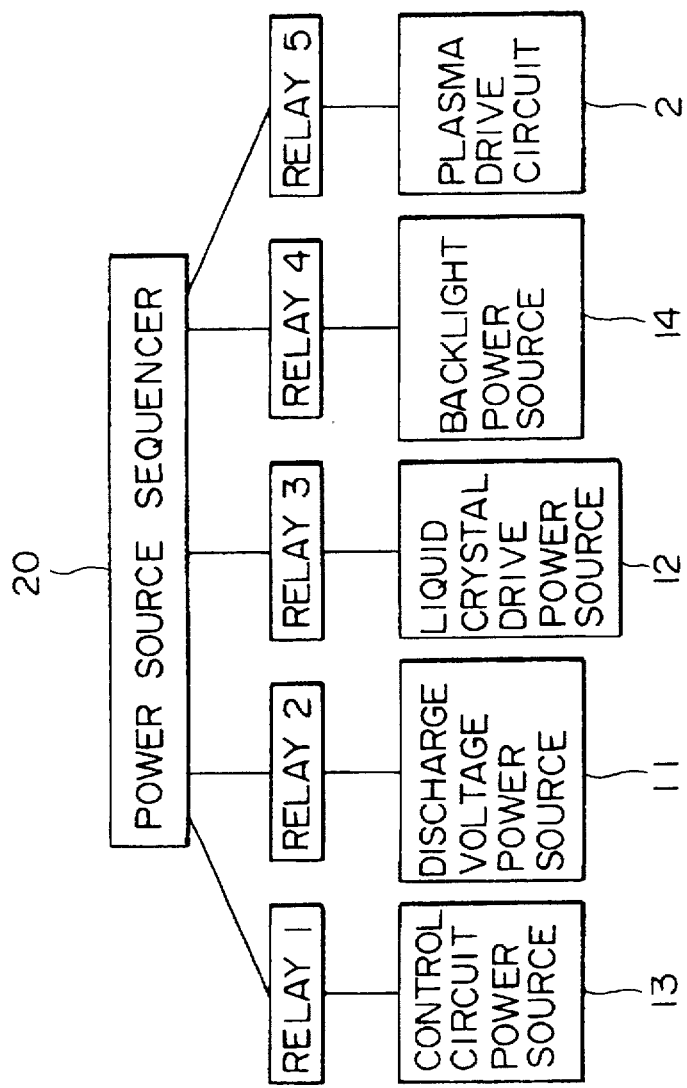

METHOD OF DRIVING PLASMA ADDRESSED DISPLAY PANEL

BACKGROUND OF THE INVENTION

1. Field of the Invention

The present invention relates to a method of driving a plasma addressed display panel of a type in which a liquid cell and a plasma cell are laminated to each other, and particularly to a technique for controlling drive circuits upon turn-on/turn-off of power switches.

2. Description of the Related Art

A plasma addressed display panel having such a configuration as shown in FIG. 4 has been disclosed in U.S. Pat. No. 5,077,553. The plasma addressed display panel has a flat structure in which a liquid crystal cell 101 is laminated on a plasma cell 102 through a dielectric sheet 103 made of a thin glass member or the like. The plasma cell 102 is formed of a lower glass base member 104. A plurality of grooves 105 are formed in the surface of the glass base member 104. Each groove 105 is hermetically sealed by the dielectric sheet 103. A gas capable of being ionized is enclosed in the groove 105. The grooves 105 thus form discharge channels 106 separated from each other. Each projecting wall portion 107 positioned between the adjacent ones of the grooves 105 serves as a bulkhead for separating the adjacent ones of the discharge channels 106 from each other, and it also serves as a gap spacer of the glass base member 104 to the dielectric sheet 103. A pair of discharge electrodes 108 and 109 parallel to each other are provided on the bottom portion of each groove 105. These discharge electrodes 108, 109 function as an anode and a cathode for ionizing a gas in the discharge channel 106 and generating a plasma discharge.

On the other hand, the liquid crystal cell 101 includes a liquid crystal layer 111 held between the dielectric sheet 103 and an upper glass base member 110. Stripe-shape signal electrodes 112 made of transparent conductor films are formed on the inner surface of the glass base member 110. The signal electrodes 112 are perpendicular to the discharge channels 106. Each signal electrode 112 is taken as a column drive unit, while each discharge channel 106 is taken as a row scan unit. Pixels are defined in a matrix, that is, arranged at positions where the signal electrodes 112 cross the discharge channels 106. This plasma addressed display panel is of a transmission type, and it is usually provided with a back-light 113 for illuminating the back surface of the panel. The back-light 113 is formed of, for example, a cathode-ray tube.

In the plasma addressed display panel having the above-described configuration, the discharge channels 106 are scanned selectively in linear-sequence for plasma discharge, and the signal electrodes 112 on the liquid crystal cell 101 side are supplied with an image signal in synchronization with the selective scan of the discharge channels 106, thus displaying a desirable signal image. When a plasma discharge is generated in the discharge channel 106, the interior thereof is kept substantially at an anode potential. When an image signal is applied to the signal electrode 112 in such a state, a signal voltage is written in the liquid crystal layer 111 of each pixel through the dielectric sheet 103. After the plasma discharge is completed, the interior of the discharge channel 106 is kept at a floating potential. As a result, the written signal voltage is held in each pixel. Namely, a so-called sampling hold is carried out. The discharge channel 106 thus functions as a sampling switch, while the liquid crystal layer 111 functions as a sampling capacitor. The transmissivity of the liquid crystal layer 111 is changed in accordance with the image signal thus sampled, and thereby the brightness of the plasma addressed display panel can be controlled in pixel-by-pixel. In addition, for generating a plasma discharge in each discharge channel, a high voltage drive pulse (for example, about 300 V) is applied between the anode and cathode. It is to be noted that since the liquid crystal layer 111 is driven through the dielectric sheet 103, an image signal having a voltage with an amplitude being about ten times that in the usual liquid crystal panel is applied to the signal electrode.

The plasma addressed display panel displays an image using a liquid crystal as an opto-electronic material. It is undesirable to apply a direct current component to the liquid crystal because the liquid crystal applied with the direct current component causes a so-called "burn-in" of an image". The plasma addressed display panel is of course driven in such a manner that any direct current component is not applied to the liquid crystal during operation. However, when the light of the plasma addressed display panel is turned off and the display panel is shifted from the operating state to the resting state, there is a fear that a direct current component is applied to liquid crystal depending on the stopping order of a signal voltage applied to a liquid crystal cell and a drive pulse applied to a plasma cell. This causes a disadvantage in generation of burn-in of an image or the like when the light of the plasma addressed display panel is subsequently turned on and the display panel is shifted from the resting state to the operating state. Moreover, the plasma addressed display panel is driven in an unstable state directly after turning on or off the light, and consequently there is a fear that a disturbed image is temporarily displayed. This is undesirable in terms of the appearance of the display. Furthermore, upon turn-on of the power switches, a resister value and the like in a logic circuit for controlling the operation of a drive circuit sometimes become unstable. When a drive pulse or a signal voltage is applied to the drive circuit in such a state, there is a fear that a large amount of current is applied to the drive circuit and thereby the drive circuit is broken.

SUMMARY OF THE INVENTION

The present invention provides the following measures to solve the above-described problems of the prior art. Namely, according to a first aspect of the present invention, a plasma addressed display panel is driven as follows. The plasma addressed display panel has a laminated structure in which a liquid crystal cell having signal electrodes arranged in columns and a plasma cell having discharge channels arranged in rows are laminated to each other. First, when the panel is in an operating state drive pulses are sequentially applied to each of the discharge channels by a plasma drive circuit supplied with power for generating plasma discharges, thereby performing a linear-sequential scan of the discharge channels; while a signal voltage is applied to each of the signal electrodes in synchronization with the linear-sequential scan of the discharge channels by a liquid crystal drive circuit supplied with power, to write the signal voltage in the liquid crystal cell. Next, when the panel is shifted from the operating state to the resting state (upon turn-off of power switches), the supply of the power to the plasma drive circuit is stopped after the supply of the power to the liquid crystal drive circuit is stopped. Preferably, the supply of the power to the plasma drive circuit is stopped after the supply of the power to the liquid crystal drive circuit is stopped and then the output of drive pulses to the plasma cell is stopped. More preferably, when the panel is in an operating state, the plasma drive circuit and the liquid crystal drive circuit are controlled for operation by a control circuit (a logic circuit) supplied with power, and when the panel is shifted from the resting state to the operating state (upon turn-on of the power switches), the supply of power to the plasma drive circuit and the liquid crystal drive circuit is started after the supply of a power to the control circuit is started to enable the control circuit.

According to a second aspect of the present invention, the plasma addressed display panel is driven as follows. In addition, the plasma addressed display panel has a structure in which a liquid crystal cell having signal electrodes arranged in columns and a plasma cell having discharge channels arranged in rows are laminated to each other and further a back light for illuminating a back surface of the panel is incorporated in the panel. First, when the panel is in an operating state, the discharge channels are scanned in a linear sequence and an image signal is applied to the signal electrodes to display an image by respective drive circuits supplied with power, and the back light is turned on for illuminating the image from a back surface of the panel. When the panel is shifted from the resting state to the operating state (upon turn-on of the power switches), the back light is turned on after the supply of power to the drive circuits is started to enable the operation of the drive circuits. On the contrary, when the panel is shifted from the operating state to the resting state (upon turn-off of the power switches), the supply of the power to the drive circuits is stopped after the back light is turned off Preferably, when the panel is in an operating state, the drive circuits are controlled for operation by a control circuit (a logic circuit) applied with power, and when the panel is shifted from the resting state to the operating state (upon turn-on of the power switches), the supply of power to the drive circuits is started after the supply of a power to the control circuit is started to enable the control circuit.

According to the first aspect of the present invention, upon turn-off of the power switches, the supply of the power to the plasma drive circuit is stopped after the supply of the power to the liquid crystal drive circuit is stopped. Accordingly, the plasma discharge on the plasma cell side is stopped after a signal voltage supplied to the liquid crystal cell is released, eliminating a possibility that an unnecessary direct current component is applied to liquid crystal. In particular, the supply of the power to the plasma drive circuit is stopped after the output of drive pulses to the discharge channels is stopped. The generation of unstable plasma discharge in the discharge channels is thus prevented, and thereby the liquid crystal is prevented from being supplied with an unnecessary direct current component through the dielectric sheet. According to the second aspect of the present invention, upon turn-on of the power switches, the back light is turned on after the supply of power to the drive circuits is started to enable the operation of the drive circuits. Accordingly, illumination of the back surface of the panel is started after a normal image is displayed. On the contrary, upon turn-off of the power switches, the supply of the power to the drive circuits is stopped after the backlight is turned off. Consequently, even if an abnormal image is displayed upon shut-down of the drive circuits, it cannot be actually observed because the back surface is not illuminated. Furthermore, upon turn-on of the power switches, the supply of power to the plasma drive circuit and the liquid crystal drive circuit is started after the supply of a power to the control circuit is started to enable the control circuit. As a result, both the drive circuits are controlled in accordance with normal logic, thereby making it possible to eliminate a possibility that an excessive current is applied thereto.

BRIEF DESCRIPTION OF THE DRAWINGS

FIG. 1 is a block diagram showing one example of a plasma addressed display driven in accordance with the present invention.

FIG. 2 is a block diagram showing a driving method of the present invention.

DETAILED DESCRIPTION OF THE PREFERRED EMBODIMENTS

Figure 4:
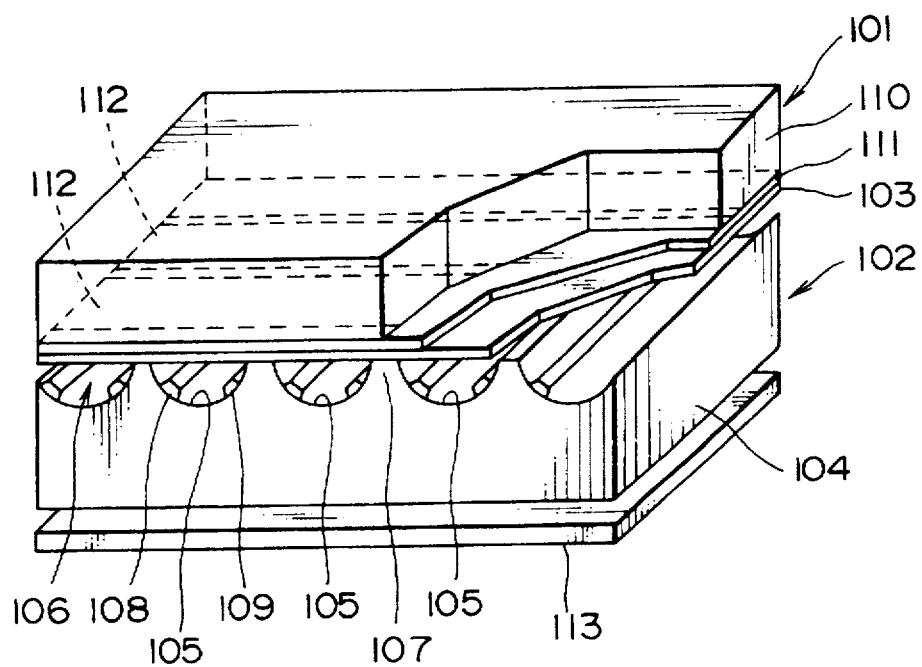
FIG. 4 is a perspective view showing a general configuration of a prior art plasma addressed display.

Hereinafter, one preferred embodiment of the present invention will be described with reference to the accompanying drawings. FIG. 1 is a typical block diagram showing one example of a plasma addressed display driven in accordance with the present invention. The plasma addressed display basically includes a panel 1, a plasma drive circuit 2, and a liquid crystal drive circuit 3. The panel 1 has a laminated structure of a liquid crystal cell and a plasma cell, which is basically similar to that shown in FIG. 4. The liquid crystal cell has signal electrodes 4 arranged in columns, while the plasma cell has discharge channels 5 arranged in rows. The discharge channel 5 is formed of a pair of discharge electrodes (an anode A and a cathode K). A pixel 6 is defined at a position where the signal electrode 4 crosses the discharge channel 5. The pixels 6 are arranged in a matrix, to form a display screen. The plasma drive circuit 2 sequentially outputs high voltage drive pulses, selecting the discharge electrodes 5, and generates plasma discharges in the selected discharge electrodes 5. In other words, the plasma drive circuit 2 performs a linear-sequential scan of the discharge channels 5. The plasma drive circuit 2 receives power from a discharge voltage power source 11 through a switch SW2, such as a relay. On the other hand, the liquid crystal drive circuit 3 supplies an image signal to the signal electrodes 4 in synchronization with the linear-sequential scan of the discharge channels 5. The liquid crystal drive circuit 3 receives power from a liquid crystal drive power source 12 through a switch SW3, such as a relay. A control circuit 7 is connected to the plasma drive circuit 2 and to the liquid crystal drive circuit 3 for generating a control signal required for controlling the logic operations of both the drive circuits 2 and 3 and for synchronizing both the drive circuits 2 and 3 with each other. The control circuit 7 receives power from a control circuit power source 13 through a switch SW1, such as a relay. In addition, the panel in this embodiment is of a transmission type, and is integrally incorporated with a back light 8 for illuminating the back surface of the panel. The back light 8 receives power from a back-light power source 14 through a switch SW4, such as a relay.

The driving method of the plasma addressed display according to the present invention will be described in detail with reference to FIG. 1. In a normal operating state, drive pulses are sequentially applied to each of the discharge channels 5 by the plasma drive circuit 2 supplied with power to generate plasma discharges, thus performing a linear-sequential scan of the discharge channels 5. On the other hand, a signal voltage is applied to each of the signal electrodes 4 in synchronization with the linear-sequential scan of the discharge channels 5 by the liquid crystal drive circuit 3 supplied with power to write the signal voltage in the liquid crystal cell.

On the contrary, when the panel is shifted from the operating state to the resting state (upon turn-off of the power switches), the supply of the power to the plasma drive circuit 2 is stopped after the supply of the power to the liquid crystal drive circuit 3 is stopped. This prevents the liquid crystal cell from being supplied with an unnecessary direct current component. In particular, the supply of the power to the plasma drive circuit 2 is stopped after the supply of the power to the liquid crystal drive circuit 3 is stopped and then the output of the drive pulses to the plasma cell is stopped. If the supply of the power to the plasma drive circuit 2 is cut off before the output of drive pulses to the plasma cell is stopped, there is a risk that unstable drive pulses can be applied to the discharge channels 5 in a transient state. In this embodiment, such a risk can be prevented. Moreover, upon turn-off of the power switches, the supply of power to both the drive circuits 2 and 3 is stopped after the back light 8 is turned off. If the supply of the power to both the drive circuits 2 and 3 is first stopped, there is a risk that the displayed image will be disturbed. At this time, if the back light 8 is left in the turned-on state, such disturbance is undesirably observed.

When the panel is shifted again from the resting state to the operating state (upon turn-on of the power switches), the supply of power to the plasma drive circuit 2 and the liquid crystal drive circuit 3 is started after the supply of a power to the control circuit 7 is started to enable the control circuit 7. As a result, the plasma drive circuit 2 and the liquid crystal drive circuit 3 are both normally driven, eliminating a risk that an excessive current is applied thereto. Moreover, upon turn-on of the power switches, the back light 8 is turned on after the supply of power to the plasma drive circuit 2 and the liquid crystal drive circuit 3 is started to enable the operations of both the drive circuits 2 and 3. In other words, when a normal image is displayed on the panel 1, the back light 8 is turned on for illuminating the image from the back surface of the panel 1. This allows a normal image to be usually displayed.

FIG. 2 is a block diagram typically showing the above-described sequence controls upon turn-on or turn-off of power switches. As shown in FIG. 2, the plasma drive circuit 2, discharge voltage power source 11, liquid crystal drive power source 12, control circuit power source 13 and back-light power source 14 are connected to a power source sequencer 20 through relays 1 to 5. The power source sequencer 20 sequentially controls the opening/closing of the relays 1 to 5 for performing timing controls in turning on/off of the power switches for the plasma drive circuit 2, liquid crystal drive circuit 3, control circuit 7 and the back light 8 shown in FIG. 1. In addition, the relays 1 to 5 correspond to the switches SW1 to SW5, respectively. The switch SW5 of FIG. 2 is also shown in FIG. 1 between the control circuit 7 and the plasma drive circuit 2.

The operation of the power source sequencer 20 shown in FIG. 2 will be described with reference to a flow chart shown in FIGS. 3A and 3B. FIG. 3A shows a power switch turning on sequence. First, the relay 1 is turned on to supply power from the control circuit power source 13 to the control circuit 7. The logic operation of the control circuit 7 is thus first enabled. Next, for example, after an elapse of 0.5 second, the relays 2 and 3 are simultaneously turned on. Accordingly, the plasma drive circuit 2 receives power by the discharge voltage power source 11, and also the liquid crystal drive circuit 3 receives power by the liquid crystal drive power source 12. The panel 1 thus reaches an operating state. Subsequently, for example, after an elapse of 1.0 second, the relay 5 is turned on to operate the plasma drive circuit 2 for starting the output of drive pulses. This leads to the linear sequential scan of the discharge channels. Finally, for example, after an elapse of 0.2 second, the relay 4 is turned on to supply power from the back-light power source 14 to the back light 8, thereby illuminating the back surface of the panel 1. At this time, the panel 1 is perfectly shifted to a normal operating state.

Figure 3B:
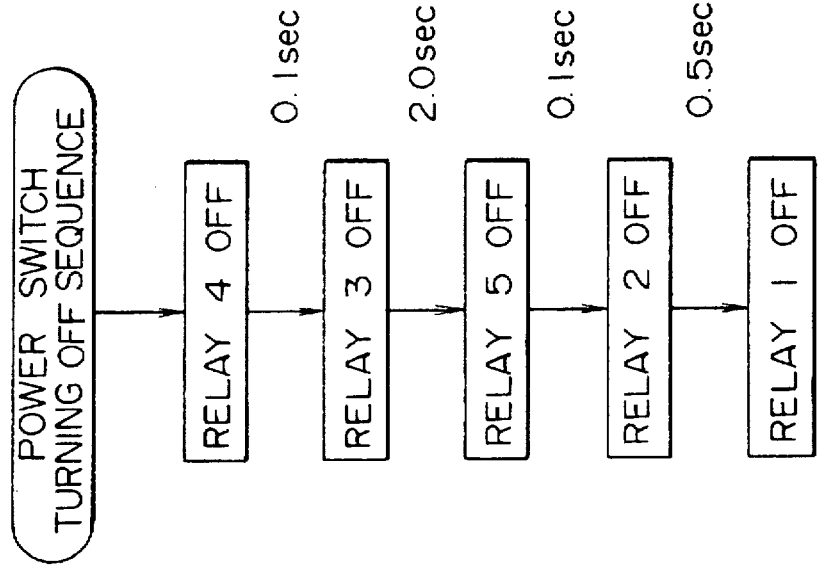
FIG. 3B is a flow chart showing a power switch turning off sequence.
Figure 3A:
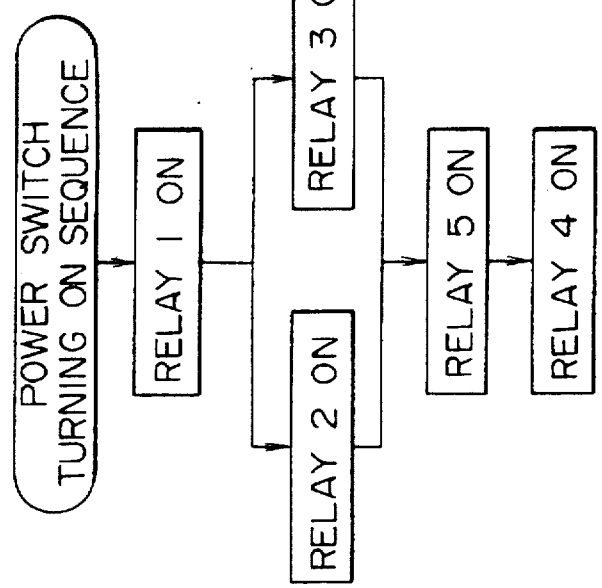
FIG. 3A is a flow chart showing a power switch turning on sequence.

FIG. 3B shows a power switch turning off sequence. First, the relay 4 is turned off to cut-off the supply of the power from the back-light power source 14, thereby turning off the back light 8. Next, after an elapse of 0.1 second, the relay 3 is turned off to cut off the supply of the power from the liquid crystal drive power source 12, so that the liquid crystal drive circuit 3 ceases the application of a signal voltage to the signal electrodes 4. Then, after an elapse of 2.0 seconds, the relay 5 is turned off to stop the output of drive pulses from the plasma drive circuit 2. Moreover, after an elapse of 0.1 second, the relay 2 is turned off to cut off the power supplied from the discharge voltage power source 11 to the plasma drive circuit 2. Finally, after an elapse of 0.5 second, the relay 1 is turned off to cut off the power supplied to the control circuit 7 from the corresponding power source 13.

As described above, according to the present invention, when the panel is shifted from the operating state to the resting state, the supply of power to the plasma drive circuit is stopped after the supply of power to the liquid crystal drive circuit is stopped. This prevents the liquid crystal cell from being supplied with a direct current component to thereby avoid burn-in of an image or the like. Upon turn-on of the power switches, the back light is turned on after the supply of power to both the drive circuits is started to enable the operation of the drive circuits. On the other hand, upon turn-off of the power switches, the supply of power to both the drive circuits is stopped after the back light is turned off. This avoids an imperfect display of an image liable to be observed upon turn-on and turn-off of the back light. Moreover, upon turn-on of the power switches, the supply of power to the plasma drive circuit and the liquid crystal drive circuit is started after the supply of power to the control circuit to enable the control circuit. This avoids open circuiting of the circuit liable to be generated upon turn-on of the back light.

Although other modifications and changes may be suggested by those skilled in the art, it is the intention of the inventor to embody within the patent warranted hereon all changes and modifications as reasonably and properly come within the scope of his contribution to the art.

I claim:

1. A method of driving a plasma addressed display panel of a type in which a liquid crystal cell having signal electrodes arranged in columns and a plasma cell having discharge channels arranged in rows are laminated to each other, comprising the steps of:

first supplying a voltage to a plasma driving circuit that is connected to the discharge channels for generating plasma discharges;

second supplying driving pulses sequentially to each of the plasma discharge channels by the plasma driving circuit for linear-sequential scanning;

third supplying a voltage to a liquid crystal driving circuit;

fourth supplying a signal voltage to each of the signal electrodes in synchronization with the linear-sequential scanning of the discharge channels by the liquid crystal drive circuit; and stopping said step of second supplying the voltage to the plasma driving circuit after stopping said step of third supplying the voltage to the liquid crystal circuit when the display is being shifted from an operating state to a resting state.

2. A method of driving a plasma addressed liquid crystal display panel as claimed in claim 1, further comprising the step of:

stopping said step of second suppling said driving pulses so said plasma discharge channels between said step of stopping the supply of the voltage to the liquid crystal circuit and said step of stopping the supply of the voltage to the plasma driving circuit when the display is shifted from the operating state to the resting state.

3. A method of driving a plasma addressed liquid crystal display panel as claimed in claim 1, further comprising the steps of:

controlling said plasma driving circuit and said liquid crystal driving circuit by a control circuit;

supplying a voltage to said control circuit before said step of supplying voltage to said plasma driving circuit and said step of supplying voltage to said liquid crystal circuit when said display is being shifted from the resting state to the operating state.

4. A method of driving a plasma addressed liquid crystal display panel as claimed in claim 1, further comprising the steps of:

turning off a back light before said step of stopping said supply of the voltage to the plasma driving circuit when said display is being shifted from the operating state to the resting state.

5. A method of driving a plasma addressed liquid crystal display panel as claimed in claim 1, further comprising the steps of:

turning on a back light after said step of stopping the supply of the voltage to the plasma driving circuit and said step of stopping the supply of voltage to the liquid crystal driving circuit when the display is being shifted from the resting state to the operating state.

6. A plasma addressed liquid crystal display, comprising:

a liquid crystal cell provided with a plurality of signal electrodes;

a plasma cell having a plurality of discharge channels;

a plasma driving voltage source connected to supply a voltage to a plasma driving circuit;

a first switch and a second switch each being connected to the plasma driving voltage source;

a liquid crystal driving voltage source for supplying a voltage to a liquid crystal driving circuit which is connected to said plurality of signal electrodes;

a third switch connected to said liquid crystal driving voltage source;

a control circuit connected to control said plasma driving circuit and said liquid crystal driving circuit;

a fourth switch connected to said control circuit;

a back light;

a fifth switch connected to said back light; and means for turning on in order 1) said fourth switch and 2) said first switch and said third switch and 3) said second switch and 4) said fifth switch.

7. A plasma addressed liquid crystal display as claimed in claim 6, further comprising: means for turning off in order 1) said fifth switch, 2) said third switch, 3) said second switch, 4) said first switch and 5) said fourth switch.

* * * * *